(12) United States Patent
Benyahia et al.

(10) Patent No.: US 10,166,706 B2
(45) Date of Patent: Jan. 1, 2019

(54) METHOD FOR PRODUCING A PLASTIC VEHICLE PART

(71) Applicant: SAINT-GOBAIN GLASS FRANCE, Courbevoie (FR)

(72) Inventors: Rym Benyahia, Stuttgart (DE); Thomas Lux, Weissach Im Tal (DE); Ahmet Turan, Allmersbach Im Tal (DE); Nicolas Fournier, Les Deux Alpes (FR)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 0 days.

(21) Appl. No.: 15/322,718

(22) PCT Filed: Jul. 9, 2015

(86) PCT No.: PCT/EP2015/065660
§ 371 (c)(1),
(2) Date: Dec. 28, 2016

(87) PCT Pub. No.: WO2016/008790
PCT Pub. Date: Jan. 21, 2016

(65) Prior Publication Data
US 2017/0165884 A1    Jun. 15, 2017

(30) Foreign Application Priority Data

Jul. 17, 2014    (EP) .................................... 14177427

(51) Int. Cl.
*B29C 45/14*    (2006.01)
*B29C 45/16*    (2006.01)
(Continued)

(52) U.S. Cl.
CPC .... *B29C 45/14688* (2013.01); *B29C 45/1671* (2013.01); *B32B 3/04* (2013.01);
(Continued)

(58) Field of Classification Search
CPC ............................................... B29C 45/14688
See application file for complete search history.

(56) References Cited

U.S. PATENT DOCUMENTS

| 8,580,878 B2 | 11/2013 | Hauck et al. | |
| 2002/0142181 A1* | 10/2002 | Atake | ............... B29C 45/14778 428/520 |

(Continued)

FOREIGN PATENT DOCUMENTS

| DE | 19722551 A1 | 12/1998 |
| DE | 102008023499 A1 | 11/2009 |

(Continued)

OTHER PUBLICATIONS

International Search Report for International Application No. PCT/EP2015/065660 filed on Oct. 14, 2015 in the name of Saint-Gobain Glass France. (English translation and German original) dated Sep. 25, 2015. 7 pages.

(Continued)

*Primary Examiner* — Betelhem Shewareged
(74) *Attorney, Agent, or Firm* — Steinfl + Bruno, LLP

(57) ABSTRACT

A method for producing a plastic vehicle attachment part is described, wherein a polymeric film is laid in an injection mold, the polymeric film having an opaque or semi-opaque imprint or a color pigmentation. The polymeric film is back injected with a polymeric covering part, wherein the polymeric covering part is optically transparent. A polymeric carrier part is sprayed at least on a part of the surface of the polymeric covering part facing away from the polymeric film. A protective layer is applied at least on the polymeric film.

20 Claims, 3 Drawing Sheets

Figure 1A:
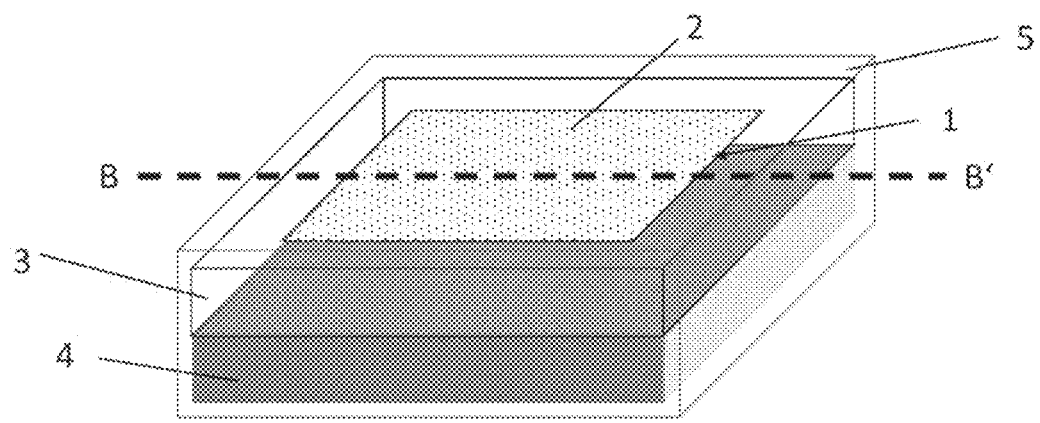

(51) Int. Cl.

| | | |
|---|---|---|
| *B32B 7/04* | (2006.01) | |
| *B32B 27/08* | (2006.01) | |
| *B32B 27/20* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 27/40* | (2006.01) | |
| *B32B 3/04* | (2006.01) | |
| *B29L 31/30* | (2006.01) | |
| *B29L 31/00* | (2006.01) | |
| *B29C 45/00* | (2006.01) | |

(52) U.S. Cl.
CPC ............ *B32B 7/045* (2013.01); *B32B 27/08* (2013.01); *B32B 27/20* (2013.01); *B32B 27/302* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *B29C 2045/0079* (2013.01); *B29C 2045/14704* (2013.01); *B29K 2995/0025* (2013.01); *B29K 2995/0026* (2013.01); *B29L 2031/3041* (2013.01); *B29L 2031/3052* (2013.01); *B29L 2031/7782* (2013.01); *B32B 2255/10* (2013.01); *B32B 2255/26* (2013.01); *B32B 2270/00* (2013.01); *B32B 2307/4023* (2013.01); *B32B 2307/4026* (2013.01); *B32B 2307/41* (2013.01); *B32B 2307/412* (2013.01); *B32B 2307/50* (2013.01); *B32B 2307/558* (2013.01); *B32B 2307/584* (2013.01); *B32B 2307/718* (2013.01); *B32B 2605/006* (2013.01); *B32B 2605/08* (2013.01)

(56) References Cited

U.S. PATENT DOCUMENTS

| | | |
|---|---|---|
| 2010/0080970 A1 | 4/2010 | Hayes et al. |
| 2013/0280452 A1 | 10/2013 | Nawroth et al. |
| 2014/0295129 A1 | 10/2014 | Lux et al. |

FOREIGN PATENT DOCUMENTS

| | | |
|---|---|---|
| DE | 102012014659 A1 | 1/2014 |
| EP | 0415716 A1 | 3/1991 |
| EP | 1190831 A1 | 3/2002 |
| EP | 1743756 A1 | 1/2007 |
| JP | 2014-502229 A | 1/2014 |
| JP | 2014-528370 A | 10/2014 |
| WO | 2013/050208 A1 | 4/2013 |

OTHER PUBLICATIONS

Hopmann, C., et al. "Car Windows made of Plastic." *Kunststoffe*, 22-27, (Feb. 2005). 6 pages.

Written Opinion for International Application No. PCT/EP2015/065660 filed Jul. 9, 2015 on behalf of Saint-Gobain Glass France. Dated Sep. 25, 2015. 17 pages. (English Translation + German Original).

* cited by examiner

METHOD FOR PRODUCING A PLASTIC VEHICLE PART

CROSS REFERENCE TO RELATED APPLICATIONS

The present application is the U.S. national stage entry of International Patent Application No. PCT/EP2015/065660, filed internationally on Jul. 9, 2015, which, in turn, claims priority to European Patent Application No. 14177427.3, filed on Jul. 17, 2014.

The invention comprises a method for producing a plastic vehicle attachment part, a plastic vehicle attachment part, and its use.

As part of increasingly stringent requirements regarding carbon dioxide emissions of motor vehicles, there are also strong efforts to reduce the weight of a vehicle and thus its fuel consumption. Constant innovations in the plastics sector enable the replacement of large parts of the metal car body by correspondingly lighter elements made of polymeric materials. In particular, parts of or even the entire window region can be replaced by elements made of polymeric materials. In many cases, along with a significantly lower weight, these present hardness, stability, and toughness comparable to that with a car body window made of steel. In addition, due to the weight reduction, the center of gravity of the vehicle is moved lower, which has a positive effect on handling. Moreover, compared to metals, polymeric materials can be produced, processed, and shaped at significantly lower temperatures. This reduces the energy demand and costs during production of the materials.

Molded parts made of polymeric materials can be produced in virtually any desired shape and geometry. Special high-performance plastics such as aramide or kevlar, for example, have very high strength and stability.

Many material parts made of plastics must satisfy various requirements and functions. In this regard, important parameters are stability, fracture behavior, scratch resistance, impact strength, or notched impact strength. In addition to technical considerations such as weight and strength of the individual components, shape, geometry, and appearance also play an increasingly important role. Especially in the automobile industry, along with mechanical properties, characteristics in the area of design and aesthetics are also of great significance.

In order to combine various characteristics in polymeric materials, they are composed of basic materials of different shapes and different natures. Established methods for producing these materials include two-component or multicomponent injection molding methods. It is thus possible to combine characteristics such as weather resistance, surface gloss, and fracture resistance or torsional stability with each other. In addition, the relative content of very expensive materials can be reduced.

DE 197 22 551 A1 discloses a method for producing plastic parts in the two-component injection molding process, wherein one of the layers is made of a solidly colored plastic.

EP 1 743 756 A1 discloses a method for producing a component using an injection molding process, in which, in a first step, a thermoplastic plastic is injected between two foils. In a second step, the first molded part thus produced is bonded to a second molded part by back injecting the first molded part with a second thermoplastic plastic. The production of such a component is relatively expensive.

EP 1 190 831 A1 discloses a method for producing a vehicle window pane made of a plastic in an injection molding process. An A, B, C, or D pillar trim is sprayed onto the vehicle window pane as a second component. The pillar trim can be decoratively colored.

The publication "Automobilscheiben aus Kunststoff [Automobile Glazings Made of Plastic]" by C. Hopmann et al. (Kunststoffe [Plastics], Carl Hanser Verlag, Munich, No. 2/05, Feb. 1, 2005, pp. 22-27, XP002396333, ISSN: 0023-5563) discloses methods for producing plastic automobile glazings and the use of varnishes for coating plastic glazings. The article further discloses that, for protective purposes, a film can be applied to a polycarbonate pane.

EP 0 415 716 A1 discloses a plastic auto glazing that is provided with a protective coating and has a frame part. This window pane is produced in an injection molding process.

DE 10 2008 023 499 A1 discloses a printing varnish and a method for producing an imprinted laminate.

One established method for producing optical effects is the method for film insert molding (FIM). In this method, an appropriate film is laid in the injection mold and back injected with a suitable plastic. In this manner, the surface properties and geometry of polymeric materials can be affected and modified selectively and versatilely. Temperature-stable films are an important prerequisite for the use of the method of film insert molding. Moreover, imprints situated on the film must also be temperature resistant enough to survive back injection with a liquid polymer such as polycarbonate. Since the film is positioned on the outside of the workpiece, it is not protected against external mechanical and chemical influences. In the long run, this can result in damage to the film and the imprint contained on the film.

Plastic window panes for vehicles are typically produced in multicomponent injection molding methods. Often, these panes include, in the edge region, a dark colored, usually black, opaque component on a transparent component, with the side of the pane that has the opaque material phase always facing the vehicle interior. In the region of the opaque component, the pane can be bonded to the vehicle body, for example, glued, invisibly from the standpoint of the observer. In contrast to prior art vehicle glazing made of mineral glass, these opaque edge regions in plastic panes are frequently larger in area and more complex in design. In these regions of the pane, this yields the capability of introducing optical trim elements and decorations into the pane.

The object of the invention is to provide a method for producing a plastic vehicle attachment part with an imprint that is protected against external influences.

The object of the invention is accomplished by a method in accordance with claim 1. Preferred embodiments emerge from the subclaims.

A plastic vehicle attachment part according to the invention and the use of a plastic vehicle attachment part emerge from other independent claims. Preferred embodiments emerge from the subclaims.

The method according to the invention for producing a plastic vehicle attachment part comprises a first step, in which a polymeric film is laid in an injection mold. In the context of the invention, the term "film" includes both homogeneous, single or multicomponent films, as well as woven, braided, or layered multicomponent films or textiles made of different or identical materials. The polymeric film is preferably fixed by electrostatic interactions on the steel surface of the injection mold. The electrostatic charge is preferably transferred without contact to the polymer film via charging electrodes that are supplied with high voltage by charging generators. Alternatively, the polymeric film can be fixed in the injection mold mechanically or via vacuum suction. The polymeric film has an opaque or semi-opaque imprint or a color pigmentation. The imprint is preferably decomposition stable at a temperature of at least 250° C., preferably at least 320° C. In the context of the invention, the term "semi-opaque imprint" also includes colored imprints and grayscale prints. The opaque imprint preferably contains a printing ink with temperature-stable organic pigments, for example, urethane-acrylate polymers, carbon, azo dyes or polycyclic compounds. Alternatively, inorganic pigments, such as titanium dioxide, carbon black, cinnabar, bismuth-(bismuthvanadate), spinel pigments, lead, mercury, zircon, iron, cadmium, copper, cobalt, nickel, chromium pigments; aluminosilicates (ultramarine), can be included. Due to the higher temperature stability, inorganic pigments are preferably used. In an alternative embodiment, the color pigments can even be homogeneously incorporated into the polymeric film. This can be done, for example, by admixing the color pigments into a granulate of the polymeric film with subsequent extrusion of the resultant mixture. In another possible option, the color pigments can be sprayed in a solution onto the polymeric film.

In the second step of the method according to the invention, the polymeric film is back injected with a transparent polymeric material phase that forms the covering part of the plastic vehicle attachment part. The liquid starting material of the polymeric covering part is injected onto the polymeric film in the injection mold, and a material bond between the polymeric film and the covering part is thus obtained. The polymeric covering part is implemented optically transparent. The optical transparency gives the polymeric covering part a glasslike appearance with only a low weight and high formability. In the context of the invention, "transparent" means that an observer can look through the component and can recognize objects that are situated behind the component from the standpoint of the observer. The transparent component can be colorless. The transparent component can also be colored or tinted. The transmittance of the transparent polymeric covering part in the visible spectral range (300 nm-800 nm) is at least 10%.

In a third step, a polymeric carrier part is sprayed onto the structure composed of the polymeric film and the polymeric covering part. The polymeric carrier part is sprayed onto the side of the polymeric covering part on which no polymeric film is applied, in other words, the sequence of materials is polymeric film-polymeric covering part-polymeric carrier part. The polymeric carrier part ensures the stability of plastic vehicle attachment part and includes polymeric materials with the highest possible strength, stiffness, impact strength, or notched impact strength and low fracturability.

The surface that is formed by the polymeric film and polymeric covering part, i.e., the surface on which the imprint is visible, is defined as the first exposed surface of the plastic vehicle attachment part. The surfaces of the vehicle attachment part that are on the outside of the part after the production of the part consisting of the polymeric covering part, the polymeric carrier part, and the polymeric film are referred to as exposed surfaces. These surfaces can be coated later in the process. The surface that is opposite the first surface, i.e., the surface that is formed at least by the opaquely implemented polymeric carrier part, is defined as the second exposed surface of the plastic vehicle attachment part. The term "exposed side surfaces" means the edge surfaces of the part that surround the individual material layers of the polymeric covering part and of the polymeric carrier part.

The polymeric carrier part can be sprayed over the entire surface of the polymeric covering part, for example, for a pillar covering or a door panel. In this case, the second exposed surface is formed by the polymeric carrier part. The polymeric carrier part can even be arranged only in a subregion of the polymeric covering part, for example, in the case of a plastic vehicle window pane that has a black region in the edge region of the pane that is formed by the polymeric carrier part. In this case, the second exposed surface is formed by the polymeric carrier part and the polymeric covering part.

In another step, a protective coating (hardcoat) is applied on the vehicle attachment part. The protective coating is applied at least on the polymeric film to protect the film and the included imprint. The protective coating is preferably applied all around, in other words, on all exposed surfaces including side surfaces of the vehicle attachment part. Preferably, thermal-curing or UV-curing varnish systems based on polysiloxanes, polyacrylates, polymethacrylates, and/or polyurethanes are used. The protective coating can have one or a plurality of separately applied layers and preferably has a total layer thickness of 1 µm to 50 µm, particularly preferably of 2 µm to 25 µm. The particular advantage resides in the scratch resistance and weather resistance as well as the chemical resistance of the polymeric workpiece due to the protective coating. The protective coating can also include UV blockers, preservatives, as well as components for increasing scratch resistance, for example, nanoparticles. In addition, the protective coating can also assume decorative functions, such as gloss or pearl effects. The protective coating can, for example, be applied on the polymeric workpiece by dipping, flooding, or spraying methods or an in-mold coating process. The protective coating is cured after application, preferably by temperature and/or UV light input.

In a final, optional step, the vehicle attachment part can be overmolded or partially overmolded with a soft component. The soft component preferably has thermoplastic elastomers (TPE, TPV), thermoplastic olefins (TPO), thermoplastic polyurethanes (TPU), polyvinyl chloride (PVC), thermoplastic polyester polymers (TPC), or styrene block copolymers (TPS) and can be colored as desired.

Thus, an improved plastic vehicle attachment part is provided that includes an imprint that is protected against external influences and is clearly visible. At the same time, a glasslike effect is produced by the transparent covering part such that the vehicle attachment part is suitable not only for internal and external components in the area of panels, for instance, as a pillar covering of the B or C pillar, but can also be used as a tinted window pane. The arrangement of the imprinted film on the transparent covering part prevents, with the presence of dark coloration of the transparent phase, the color of the imprint from being distorted. With the use of the vehicle attachment part as a tinted window pane (e.g., in the case of privacy glazing), this arrangement has the advantage that the imprint is clearly visible and—in contrast to an arrangement under the transparent covering part—is clearly discernible without color changes.

The plastic vehicle attachment part is preferably produced in the multicomponent injection molding process or in the multicomponent injection-compression process, particularly preferably in combination with turning plate, rotary table, and/or index plate technology. Alternatively, the plastic vehicle attachment part can also be produced using turning plate, rotary table, and/or index plate technology alone.

The polymer carrier part preferably contains polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), preferably acrylonitrile butadiene styrene (ABS), acrylonitrile styrene acrylester (ASA), acrylonitrile butadiene styrene-polycarbonate (ABS/PC), PET/PC, PBT/PC, and/or copolymers or mixtures thereof.

The polymeric carrier part is preferably implemented opaque. Thus, the contrast of the imprint included on the polymeric film is improved compared to a transparent implementation of the carrier part. In the context of the invention, "opaque" means that an observer cannot see through the components. The transmittance of the opaque carrier part in the visible spectrum is thus significantly reduced and is preferably less than 10%, preferably less than or equal to 5%, in particular roughly 0%.

The polymeric carrier part is preferably injection molded in a thickness from 0.5 mm to 10 mm, particularly preferably 1 mm to 5 mm. The thickness of the polymeric carrier part depends on the dimensions and stability requirements of the finished component.

The polymeric covering part is preferably injection molded in a thickness from 1 mm to 10 mm, preferably 2 mm to 5 mm. In this range, a glasslike effect that is particularly pronounced visually is achieved.

The polymeric film preferably contains polycarbonates (PC), polymethyl methacrylate (PMMA), polyethylene terephthalate (PET), polybutylene terephthalate (PBT), polycarbonate-polybutylene terephthalate (PBT/PC), styrene acrylonitrile (SAN), and/or copolymers or mixtures thereof. The polymeric film preferably contains the same material as the polymeric covering part, since, then, with the back injection of the polymeric film with the polymeric covering part, the film is connected with no transition to the polymeric covering part, a situation that is particularly advantageous from a visual standpoint.

The polymeric film preferably has a thickness from 0.1 mm to 3 mm, preferably 0.12 mm to 1 mm. The surface area of the polymeric film can vary depending on the imprint to be applied and on the dimensioning of the polymeric carrier part and of the polymeric covering part. The polymeric film can extend over the entire surface of the covering part, i.e., the entire first exposed surface is formed by the polymeric film. Alternatively, the film can extend over only a subregion of the first exposed surface such that an edge region remains free of the polymeric film. Preferably, the film extends over a region of 2% to 80%, preferably 3% to 30%, particularly preferably 5% to 15% of the entire surface of the polymeric covering part. A film that extends over only a subregion of the polymeric covering part has the advantage that the latter can be fixed by adhesion in the injection mold without additional fixation measures being required. In the case of relatively small films, the risk of air bubbles being enclosed during back injection of the film or of the film being undermined by injection molding compound is minimized. The vehicle attachment part can thus be produced more efficiently. However, the film can particularly preferably also extend over only the region of the imprint.

In another preferred embodiment, the polymeric film comprises a plurality of individual polymeric films with a decorative imprint wherein the individual polymeric films each extend over a subregion of the polymeric covering part. Thus, using a simple process, relatively complex compound decorative imprints can be integrated into the component.

With use of the vehicle attachment part as a vehicle window pane, the imprint is preferably applied in the region of the carrier part such that the driver's view through the transparent window region is not impaired by the imprint. The polymeric film is preferably preformed, particularly preferably thermally preformed. Prior shaping of the polymeric film permits better adaptation to the geometry of the injection mold cavity and the covering part. In addition, this prevents infiltration of the polymeric phase between the polymeric covering part and the polymeric film during back injection of the polymeric film with the polymeric covering part.

The invention further includes a plastic vehicle attachment part that comprises at least an opaque polymeric carrier part, a transparent polymeric covering part, a polymeric film, and a protective coating on the polymeric film. The polymeric film is arranged on the transparent polymeric covering part, with the polymeric film having an opaque or semi-opaque imprint. The polymeric carrier part is applied on the side of the transparent covering part that has no polymeric film, i.e., the carrier part is applied on the surface of the transparent covering part that is opposite the polymeric film. The polymeric carrier part ensures the stability of the plastic vehicle attachment part and includes, as described above, polymeric materials such as polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), preferably acrylonitrile butadiene styrene (ABS), acrylonitrile styrene acrylester (ASA), acrylonitrile butadiene styrene-polycarbonate (ABS/PC), PET/PC, PBT/PC, and/or copolymers or mixtures thereof.

The polymeric carrier part preferably contains inorganic or organic fillers, particularly preferably $SiO_2$, $Al_2O_3$, $TiO_2$, clay minerals, silicates, zeolites, glass fibers, carbon fibers, glass beads, organic fibers, and/or mixtures thereof. The fillers can further increase the stability of the carrier part. Furthermore, the fillers can reduce the content of polymeric materials and thus reduce the production costs of the part.

The polymeric covering part can assume both decorative functions and functions in the area of component resistance. Examples of this are surfaces or coatings that increase weather, UV, or chemical resistance. The polymeric film serves as the carrier of the opaque or semi-opaque imprint. The imprint can be applied on the side of the film that points into the injection mold at the time of placement in the injection mold such that, in the finished vehicle attachment part, the imprint ends up on the first exposed surface of the finished vehicle attachment part. Alternatively, the imprint can also be mounted on the side of the film that points toward the transparent polymeric covering part, by which means the imprint is not directly exposed to external influences. In the case of a multilayer film, the imprint can even be arranged between two individual layers of the film, by which means the imprint is somewhat protected, in the finished vehicle attachment part, against external influences. The imprint is preferably decomposition stable at at least 250° C., preferably 320° C., since, otherwise, the imprint or the color pigments would decompose or wash out during the spraying on of the polymeric covering part. The opaque or semi-opaque imprint is preferably thermal-decomposition stable in the range from 150° C. to 350° C., particularly preferably 200° C. to 320° C. The polymeric film is likewise preferably decomposition stable at at least 150° C., particularly preferably at least 320° C., otherwise, gas bubbles and discolorations could form in the region of the polymeric film in the finished workpiece.

The polymeric film is preferably thermal-decomposition stable in the range from 200° C. to 320° C. Suitable film materials here are, primarily, polymethyl methacrylate (PMMA) and polycarbonate (PC). These polymeric films can be oversprayed with a variety of transparent polymers that form the covering part. The polymeric film can, in an alternative embodiment, also be colored, black, or gray.

The polymeric film preferably does not extend over the entire surface of the polymeric covering part. Preferably, an edge region of at least 0.1 cm to 5 cm without polymeric film is arranged. The edge region without film ensures a very uniform edge sealing. In addition, the edge region can assume decorative functions.

The invention further includes the use of the plastic vehicle attachment part for interior and exterior applications in vehicles, preferably for external application. The plastic vehicle attachment part is preferably used as A, B, or C pillar covering in vehicles, particularly preferably as a tinted window pane in vehicles. The use of the plastic vehicle attachment part as a radiator grill panel or as a spoiler element is also possible.

The invention is explained in detail with reference to drawings and exemplary embodiments. The drawings are purely schematic representations and are not true to scale. The drawings in no way restricts the invention.

Figure 1B:
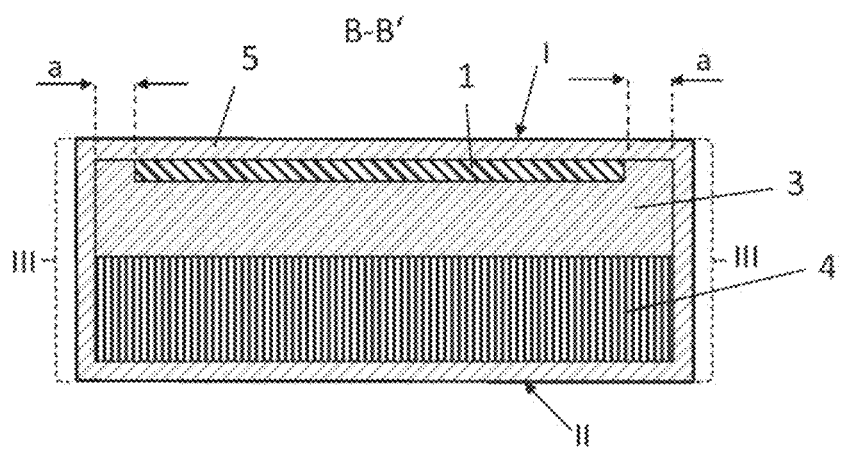
Figure 2A:
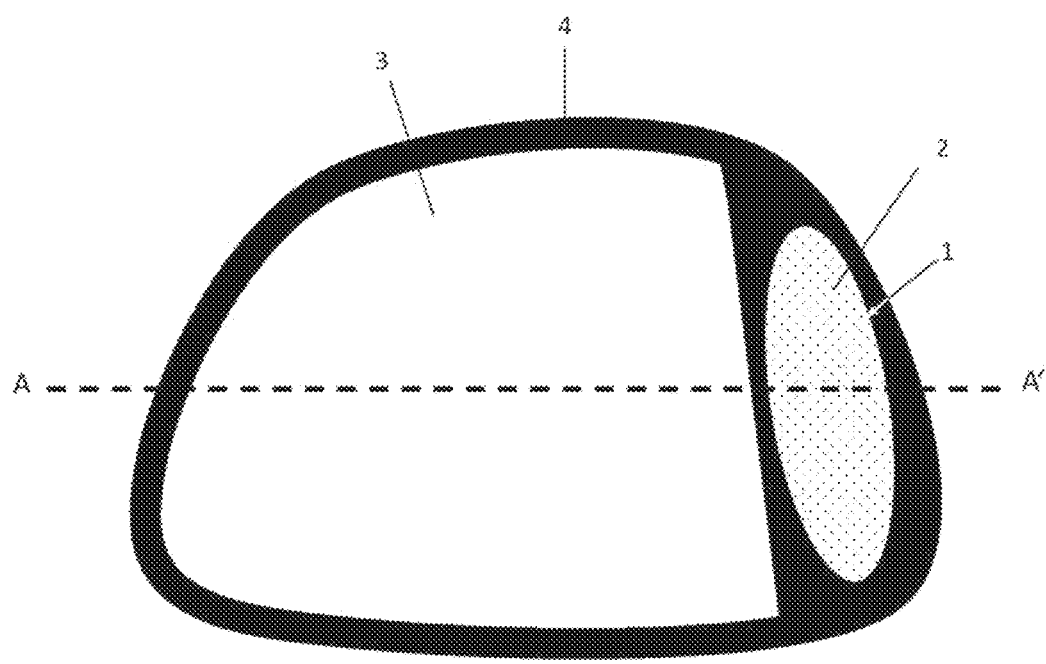
Figure 2B:
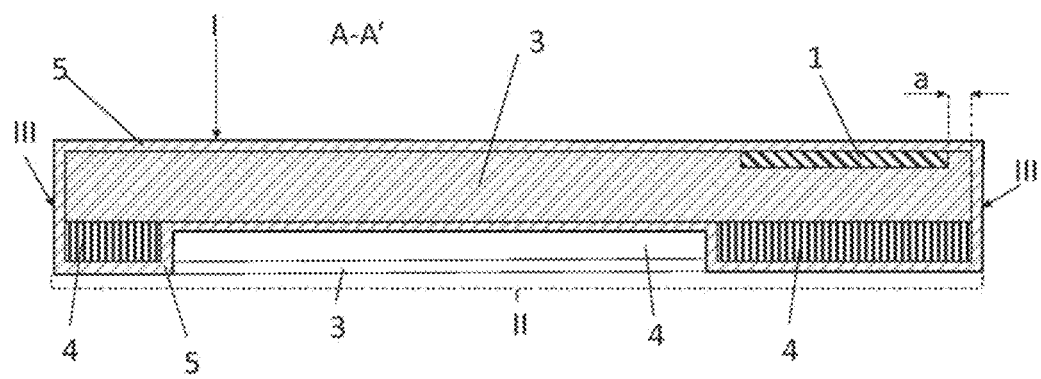
Figure 3:
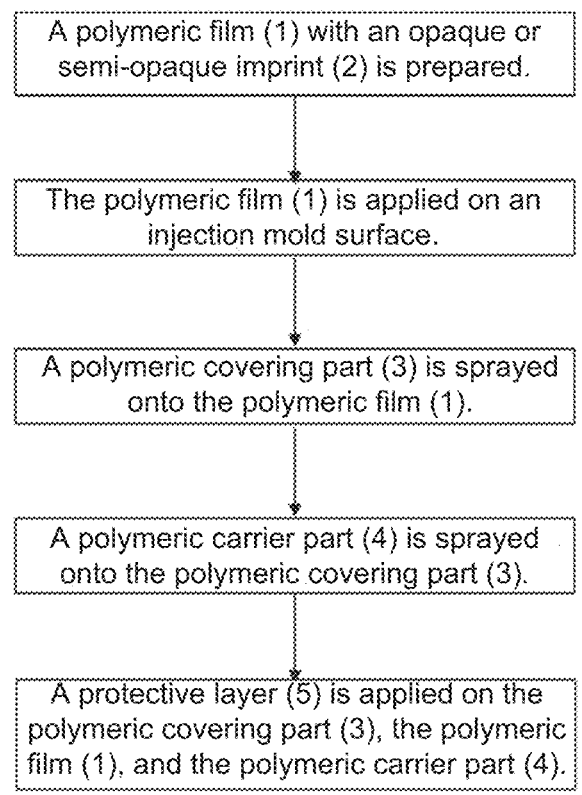

They depict:

FIG. 1a: a schematic view of a plastic vehicle attachment part according to the invention, FIG. 1b: a cross-section along B-B' through the plastic vehicle attachment part according to the invention of FIG. 1a, FIG. 2a: a schematic view of a plastic vehicle window pane according to the invention, FIG. 2b: a cross-section along A-A' through the plastic vehicle window pane according to the invention, and FIG. 3: a flowchart of the method according to the invention for producing a plastic vehicle attachment part.

FIG. 1 depicts a schematic view of a plastic vehicle attachment part according to the invention, for example, a B pillar covering of a motor vehicle. A transparent polymeric covering part 3 made of PC or PMMA is arranged on an opaque polymeric carrier part 4 made of acrylonitrile butadiene styrene (ABS). The transparent polymeric covering part 3 produces a glasslike effect with a depth effect on the surface of the opaque carrier part 4. A 0.5-mm-thick polymeric film 1 with a decorative imprint 2 is arranged on the transparent polymeric covering part 3. The polymeric film 1 does not extend over the entire surface of the polymeric covering part 3. An edge region with a width of roughly 0.2 cm is free of polymeric 1, by which means an improved edge sealing is obtained. A protective layer 5, for example, a polysiloxane based varnish is arranged on all exposed surfaces I and II and side surfaces III of the plastic vehicle attachment part. The protective layer 5 protects the polymeric film 1, the polymeric covering part 3, and the polymeric carrier part 4 against damage from mechanical and chemical influences. The exposed side surfaces III are also covered by a protective layer 5 and protected against external influences. It is discernible in the cross-section of the part according to the invention that the polymeric film 1 is surrounded in the edge region of the part by the material of the polymeric covering part 3 and the polymeric film 1 is embedded in the transparent covering part 3. This stable fixing of the polymeric film 1 without a visible transition to the polymeric covering part 3 is done with the back injection of the polymeric film 1 with the hot material of the transparent covering part 3.

FIG. 2a depicts a schematic view of a plastic vehicle window pane according to the invention. In the region of the pane edge outside the field of view, vehicle window panes often include a darkly colored, opaque component on a transparent component. In the region of the opaque component, the pane can be connected to the vehicle body invisibly from the standpoint of the observer. This dark region is formed in the example according to the invention by a black carrier part 4 made of a PC/ABS mixture in a thickness of 2.5 mm. At this thickness, the carrier part 4 the vehicle window pane gives the vehicle window pane the necessary stiffness. A transparent covering part 3 made of polycarbonate in a thickness of 4 mm is applied on this carrier part 4. At this thickness, there is sufficient impact strength, which is necessary with use as vehicle glazing. The transparent covering part 3 can be tinted, as is necessary, for example, in the field of privacy glazing. A polymeric film 1 with a decorative imprint 2 is arranged on the polymeric transparent covering part 3. As can be seen in FIG. 2b, the polymeric film 1 is embedded in the polymeric covering part 3 and is applied only above the carrier part 4 in order to obtain a good contrast of the decorative imprint 2 in front of the opaquely implemented carrier part 4. An edge region with a width a of 0.1 cm is free of polymeric film 1 in order to obtain particularly good edge sealing. A protective layer 5 containing a polysiloxane varnish is arranged over the polymeric film 1 and the transparent covering part 3 on the first exposed surface I. This varnish protects the polymeric film 1 and the decorative imprint 2 against abrasion, weathering, and damage. By means of the coating of the polymeric covering part 3 with a polysiloxane hardcoat, it is possible to satisfy the very high requirements that are customarily only imposed on safety glazing (Rigid Plastic Glazings, ECE R43 Annex 14, Class/M). In the example depicted, the varnish is applied on all exposed surfaces I, II, and III of the vehicle window pane in order to improve the scratch resistance of the pane on the first and second exposed surfaces and also to protect the exposed side surfaces III of the vehicle window pane.

FIG. 3 depicts a flowchart of the method according to the invention for producing a plastic vehicle attachment part according to the invention. In a first process step, a polymeric film 1 is provided with an opaque or semi-opaque imprint 2 decomposition-stable at a temperature of 320° C. The imprint 2 is preferably applied via a screenprinting or ink jet printing process. The polymeric film 1 is then laid in an injection mold and back injected with a transparent polymeric covering part 4 (the liquefied polymeric material of the polymeric covering part). In a final step, a polymeric carrier part 4 is sprayed onto the polymeric film 1 and the polymeric covering part 3. After the curing of the polymeric covering part 3 and of the polymeric carrier part 4, a protective layer 5 (hardcoat) it is applied to improve the mechanical and chemical resistance. The hardcoat can be applied by flooding, spraying, or dipping. The protective layer 5 is applied on the first exposed surface I, i.e., on the polymeric covering part 3 and the polymeric film 1 and on the second exposed surface II, i.e., at least on the polymeric carrier part 4. In the case of coating with polysiloxane hardcoat, even the very high requirements that are usually imposed only on safety glazing (glazings of rigid plastic, ECE R43 Annex 14, Class/M), can be satisfied.

LIST OF REFERENCE CHARACTERS (1) polymeric film
(2) imprint (3) polymeric covering part
(4) polymeric carrier part
(5) protective layer
(a) width of the edge region without polymeric film
(I) first exposed surface of the plastic vehicle attachment part
(II) second exposed surface of the plastic vehicle attachment part
(III) exposed side surfaces of the plastic vehicle attachment part

The invention claimed is:

1. A method for producing a plastic vehicle attachment part comprising the steps of:
    laying in an injection mold a polymeric film having an opaque or semi-opaque imprint or a color pigmentation,
    back injecting the polymeric film with an optically transparent polymeric covering part,
    spraying a polymeric carrier part on at least a part of a surface of the polymeric covering part that faces away from the polymeric film, and
    applying a protective layer at least on the polymeric film.

2. The method according to claim 1, wherein the protective layer is applied on all exposed surfaces of the plastic vehicle attachment part.

3. The method according to claim 1, wherein the polymeric carrier part is opaque.

4. The method according to claim 1, wherein the polymeric covering part is injection molded with a thickness from 1 mm to 10 mm.

5. The method according to claim 1, wherein the polymeric carrier part is injection molded with a thickness from 0.5 mm to 10 mm.

6. The method according to claim 1, wherein the polymeric covering part comprises polycarbonates (PC), polymethyl methacrylate (PMMA), styrene acrylonitrile (SAN), polyethylene terephthalate (PET), and/or copolymers or mixtures thereof.

7. The method according to claim 1, wherein the polymeric carrier part comprises polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), and/or copolymers or mixtures thereof.

8. The method according to claim 1, wherein the protective layer comprises thermal-cured or UV-cured varnishes, and/or mixtures or copolymers thereof.

9. The method according to claim 1, wherein the polymeric film contains polycarbonates (PC), polymethyl methacrylate (PMMA), polyethylene terephthalate (PET), polybutylene terephthalate (PBT), polycarbonate—polybutylene terephthalate (PBT/PC), styrene acrylonitrile (SAN), and/or copolymers or mixtures thereof.

10. The method according to claim 1, wherein the polymeric film has a thickness from 0.1 mm to 3 mm.

11. The method according to claim 1, wherein the polymeric film is pre-formed.

12. The method according to claim 1, wherein the polymeric film extends over a region of 3% to 30% of an entire surface of the polymeric covering part.

13. The method according to claim 1, wherein the polymeric film comprises a plurality of individual polymeric films, which respectively extend over a sub-region of the entire surface of the polymeric covering part.

14. A plastic vehicle attachment part comprising:
    a polymeric film having an opaque or semi-opaque imprint or a color pigmentation, wherein the polymeric film is back injected with an optically transparent polymeric covering part,
    an opaque polymeric carrier part sprayed at least onto a part of a surface of the optically transparent polymeric covering part, and
    a protective layer applied at least on the polymeric film.

15. The plastic vehicle attachment part according to claim 14, wherein the imprint contains organic pigments or inorganic pigments.

16. A method comprising:
    using the plastic vehicle attachment part according to claim 14 as an exterior attachment part for a vehicle.

17. The method according to claim 4, wherein the thickness is from 2 mm to 5 mm.

18. The method according to claim 5, wherein the thickness is from 1 mm to 5 mm.

19. The method according to claim 1, wherein the polymeric carrier part comprises acrylonitrile butadiene styrene (ABS), acrylonitrile styrene acrylester (ASA), acrylonitrile butadiene styrene-polycarbonate (ABS/PC), PET/PC, PBT/PC, and/or copolymers or mixtures thereof.

20. The method according to claim 1, wherein the protective layer contains polysiloxanes, polyacrylates, polymethacrylates, and/or mixtures or copolymers thereof.

* * * * *